United States Patent
Atlas

(10) Patent No.: US 10,243,657 B1
(45) Date of Patent: Mar. 26, 2019

(54) EFFICIENT OPTICAL TRANSPORT IN RADIO ACCESS NETWORKS

(71) Applicant: FUJITSU LIMITED, Kawasaki-shi, Kanagawa (JP)

(72) Inventor: Dogan A. Atlas, Johns Creek, GA (US)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/894,505

(22) Filed: Feb. 12, 2018

(51) Int. Cl.
*H04B 10/00* (2013.01)
*H04B 10/2575* (2013.01)
*H04J 14/00* (2006.01)
*H04W 16/28* (2009.01)

(52) U.S. Cl.
CPC . *H04B 10/25759* (2013.01); *H04B 10/25753* (2013.01); *H04W 16/28* (2013.01)

(58) Field of Classification Search
CPC .......... H04B 10/2575; H04B 10/25752; H04B 10/25753; H04B 10/25758; H04B 10/25759
See application file for complete search history.

(56) References Cited

U.S. PATENT DOCUMENTS

| | | | |
|---|---|---|---|
| 2015/0162990 A1* | 6/2015 | Daiber | H04B 10/503 398/183 |
| 2015/0365934 A1* | 12/2015 | Liu | H04L 5/0039 370/329 |
| 2016/0127041 A1* | 5/2016 | Lozhkin | H04B 10/2507 398/115 |

OTHER PUBLICATIONS

Symington, Steve. "Why Straight Path Communications Inc. Stock Jumped Today." The Motley Fool, retrieved from url: https://www.fool.com/investing/2017/04/25/why-straight-path-communications-inc-stock-jumped.aspx, Apr. 25, 2017; 4 pages.
Macknofsky, E. Gary. "Understanding the Basics of CPRI Fronthaul Technology." Application Note-310, EXFO (2015); 4 pages.

* cited by examiner

*Primary Examiner* — Daniel G Dobson
(74) *Attorney, Agent, or Firm* — Baker Botts L.L.P.

(57) ABSTRACT

A method and system for bandwidth efficient optical transport in radio access networks using radio-over-fiber optical transport may directly transmit radio access signals over an optical fiber by frequency multiplexing multiple parallel streams of digital wireless signals into a serial stream of optical digital subcarrier signals. A radio-over-fiber transceiver to enable efficient optical transport in radio access networks may be implemented on remote radio head and baseband unit equipment as a plug-in digital coherent optics module or as an on-board internally mounted digital coherent optics module.

16 Claims, 6 Drawing Sheets

EFFICIENT OPTICAL TRANSPORT IN RADIO ACCESS NETWORKS

BACKGROUND

Field of the Disclosure

The present disclosure relates to radio access networks and, specifically, to efficient optical transport in radio access networks.

Description of the Related Art

As radio access networks that provide wireless network access to mobile user devices have been further developed over the years, new generations of networking standards have been implemented about every decade since the first generation (1G) systems were introduced. As each new generation appears, different frequency bands and new transmission technology has enabled higher data rates to be provided via radio access networking.

Advancements in third generation (3G) systems have included a distributed base station architecture in which a remote radio head (RRH) was separated from a baseband unit (BBU) in a base station using an optical fiber (or sometimes a microwave link) for more flexible network design and rollout. The network segments that connect standalone RRHs with centralized BBUs at cell locations are referred to as a "fronthaul" network in the distributed base station architecture, while a "backhaul" network refers to the network that interconnects BBUs.

Recently, fourth generation (4G) network systems have been widely adopted, such as Long-Term Evolution (LTE), and continue to grow rapidly. Many new radio access network (RAN) technologies and wireless topologies continue to be developed for LTE, including so-called heterogeneous wireless network architectures that include numerous so-called "small cells" (including so-called "picocells" and "femtocells"). Concurrently fixed network and wireless network access traffic volumes continue to grow due to throughput demands from applications such as 4k Ultra High-Definition (UHD) video, the Internet of Things (IoT), cloud computing, virtual reality (VR), augmented reality (AR), among others.

With the approaching advent of fifth generation (5G) radio access networks, even greater increases in capacity, reduction in latency, and improved connectivity are expected. In the 4G architecture, RRHs co-located at antenna sites typically communicate with BBUs using a standard interface, such as a common public radio interface (CPRI), which may be implemented using a fiber optic fronthaul connection. However, CPRI involves significant overhead that limits data throughput efficiency, even when using an optical network connection, and may be economically and practically unsuitable for 5G fronthaul applications for this reason.

SUMMARY

In one aspect, a system for radio-over-fiber transmission of wireless signals is disclosed. The system may include a radio-frequency (RF) antenna enabled to communicate using a plurality of digital wireless signals, including incoming digital wireless signals and outgoing digital wireless signals, with a corresponding plurality of wireless devices, a baseband unit (BBU), and a remote radio head (RRH) coupled to the RF antenna. The RRH may be enabled for wirelessly receiving the incoming digital wireless signals using the RF antenna, modulating the incoming digital wireless signals onto first serial streams of optical digital subcarrier (ODS) signals in the frequency domain, wherein the modulating includes phase modulation of at least one polarization component in the optical domain, and wherein the first serial streams of ODS signals carry the incoming digital wireless signals, transmitting the first serial streams of ODS signals via an optical fiber to the BBU, receiving second serial streams of ODS signals via the optical fiber from the BBU, demodulating the outgoing digital wireless signals from the second serial streams of ODS signals, wherein the demodulating includes phase demodulation of at least one polarization component in the optical domain, and wherein the second serial streams of ODS signals carry the outgoing digital wireless signals, and wirelessly transmitting the outgoing digital wireless signals via the RF antenna.

In any of the disclosed embodiments of the system, the BBU may be enabled for receiving the first serial streams of ODS signals via the optical fiber from the RRH, demodulating the incoming digital wireless signals from the first serial streams of ODS signals, reconstructing a first plurality of digital data streams corresponding to the incoming digital wireless signals, and outputting the first plurality of digital data streams to a network.

In any of the disclosed embodiments, the BBU may be enabled for receiving a second plurality of digital data streams corresponding to the outgoing digital wireless signals, reconstructing the outgoing digital wireless signals from the second plurality of digital data streams, modulating the outgoing digital wireless signals onto the second serial streams of ODS signal, and transmitting the second serial streams of ODS signals via the optical fiber to the RRH.

In any of the disclosed embodiments, modulating the incoming digital wireless signals onto the first serial streams of ODS signals may further include modulating each incoming digital wireless signal from the RRH onto a respective optical channel in the first serial streams of ODS signals.

In any of the disclosed embodiments, modulating the incoming digital wireless signals onto the first serial streams of ODS signals may further include modulating at least two incoming digital wireless signals from the RF antenna onto an optical channel in the first serial streams of ODS signals.

In any of the disclosed embodiments, the RF antenna may include a massive multiple input multiple output antenna array.

In any of the disclosed embodiments, the RF antenna may include an interleaved hybrid beam-forming antenna.

In a further aspect, a radio-over-fiber transceiver for use at a remote radio head (RRH) for radio-over-fiber transmission is disclosed. The radio-over-fiber transceiver may include first circuitry to receive a plurality of analog signals, the analog signals directly corresponding to a plurality of digital wireless signals communicated by a radio-frequency (RF) antenna and including incoming digital wireless signals and outgoing digital wireless signals, the RF antenna enabled to communicate the digital wireless signals with a corresponding plurality of wireless devices, second circuitry for modulating the incoming digital wireless signals onto first serial streams of optical digital subcarrier (ODS) signals in the frequency domain, wherein the modulating includes phase modulation of at least one polarization component in the optical domain, and wherein the first serial streams of ODS signals carry the incoming digital wireless signals, third circuitry for transmitting the first serial stream of ODS signals via an optical fiber to a baseband unit (BBU), fourth circuitry for receiving second serial streams of ODS signals via the optical fiber from the BBU, fifth circuitry for demodulating the outgoing digital wireless signals from the second serial streams of ODS signals, wherein the demodulating includes phase demodulation of at least one polarization component in the optical domain, and wherein the second serial streams of ODS signals carry the outgoing digital wireless signals, and sixth circuitry for wirelessly transmitting the outgoing digital wireless signals via the RF antenna.

In any of the disclosed embodiments of the radio-over-fiber transceiver, the second circuitry may be further for modulating each incoming digital wireless signal from the RF antenna onto a respective optical channel in the first serial streams of ODS signals.

In any of the disclosed embodiments, the second circuitry may be further for modulating at least two incoming digital wireless signals from the RF antenna onto an optical channel in the first serial streams of ODS signals.

In any of the disclosed embodiments, the first circuitry and the sixth circuitry may be enabled to communicate with the RF antenna, and the RF antenna may include a massive multiple input multiple output antenna array.

In any of the disclosed embodiments, the first circuitry and the sixth circuitry may be enabled to communicate with the RF antenna, and the RF antenna may include an interleaved hybrid beam-forming antenna.

In any of the disclosed embodiments, the radio-over-fiber transceiver may be implemented as a plug-in digital optics module.

In any of the disclosed embodiments, the radio-over-fiber transceiver may be implemented as a board mounted digital optics module.

In yet a further aspect, a method for radio-over-fiber transmission of wireless signals is disclosed. The method may include communicating a plurality of digital wireless signals using a radio-frequency (RF) antenna, the digital wireless signals including incoming digital wireless signals and outgoing digital wireless signals, the digital wireless signals for communicating with a corresponding plurality of wireless devices, wirelessly receiving the incoming digital wireless signals using the RF antenna, modulating the incoming digital wireless signals onto first serial streams of optical digital subcarrier (ODS) signals in the frequency domain, wherein the modulating includes phase modulation of at least one polarization component in the optical domain, and wherein the first serial streams of ODS signals carry the incoming digital wireless signals, transmitting the first serial streams of ODS signals via an optical fiber to a baseband unit (BBU), receiving second serial streams of ODS signals via the optical fiber from the BBU, demodulating the outgoing digital wireless signals from the second serial streams of ODS signals, wherein the demodulating includes phase demodulation of at least one polarization component in the optical domain, and wherein the second serial streams of ODS signals carry the outgoing digital wireless signals, and wirelessly transmitting the outgoing digital wireless signals via the RF antenna.

In any of the disclosed implementations, the method may further include performing, by the BBU, receiving the first serial streams of ODS signals via the optical fiber, demodulating the incoming digital wireless signals from the first serial streams of OTN signals, reconstructing a first plurality of digital data streams corresponding to the incoming digital wireless signals, and outputting the first plurality of digital data streams to a network.

In any of the disclosed implementations, the method may further include performing, by the BBU, receiving a second plurality of digital data streams corresponding to the outgoing digital wireless signals, reconstructing the outgoing wireless signals from the second plurality of digital data streams, modulating the outgoing digital wireless signals onto the second serial streams of ODS signals, and transmitting the second serial streams of ODS signals via the optical fiber.

In any of the disclosed implementations, modulating the incoming digital wireless signals onto the first serial streams of ODS signals may further include modulating each incoming digital wireless signal from the RRH onto a respective optical channel in the first serial streams of ODS signals.

In any of the disclosed implementations, modulating the incoming digital wireless signals onto the first serial streams of ODS signals may further include modulating at least two incoming digital wireless signals from the RF antenna onto an optical channel in the first serial streams of ODS signals.

In any of the disclosed implementations, the RF antenna may include a massive multiple input multiple output antenna array or an interleaved hybrid beam-forming antenna.

Figure 1:
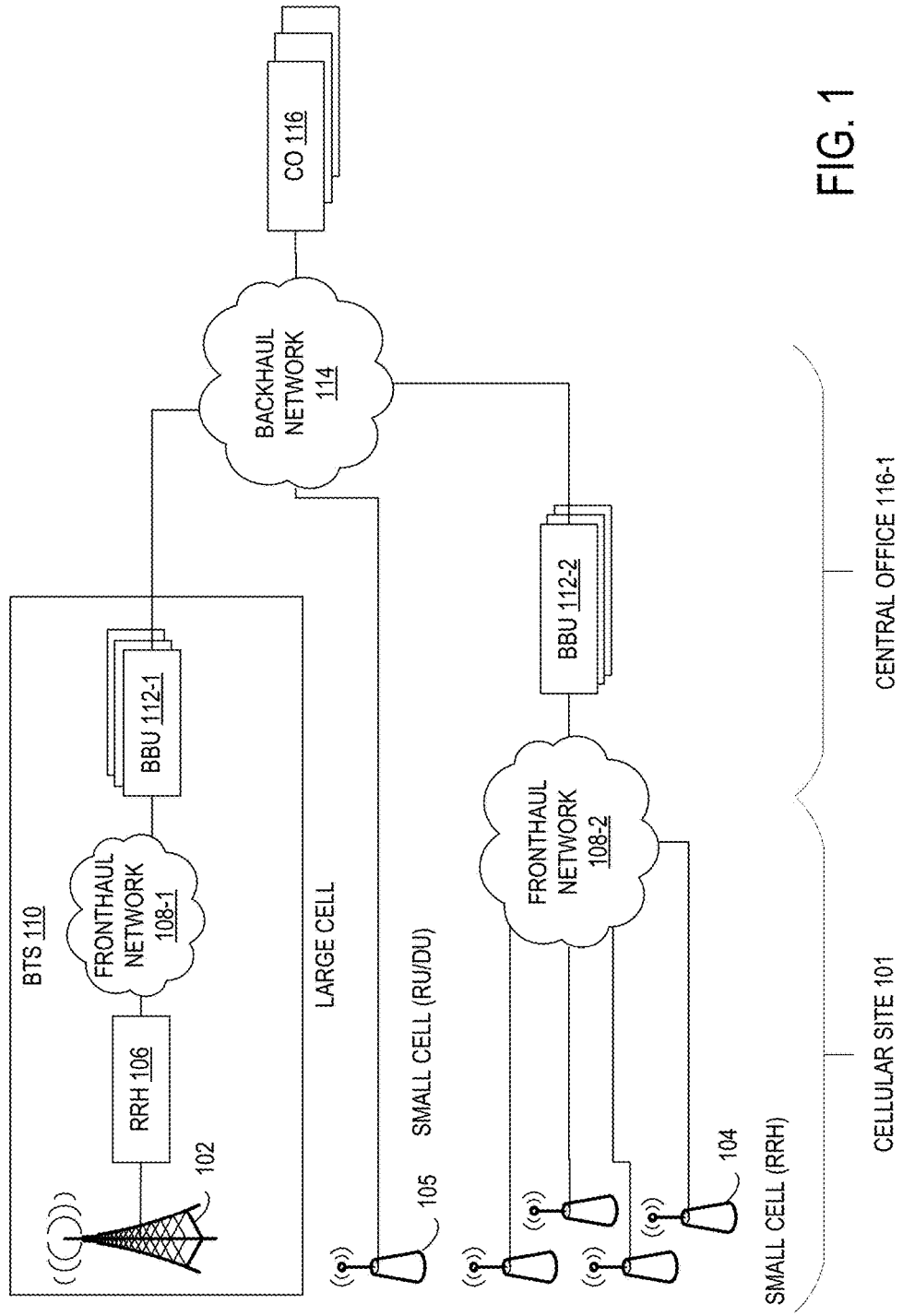
FIG. 1 is a block diagram of selected elements of an implementation of a heterogeneous wireless network architecture.

DESCRIPTION OF PARTICULAR
IMPLEMENTATION(S)

In the following description, details are set forth by way of example to facilitate discussion of the disclosed subject matter. It should be apparent to a person of ordinary skill in the field, however, that the disclosed implementations are exemplary and not exhaustive of all possible implementations.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

As noted previously, traffic volumes in radio access networks continue to grow due to throughput demands from applications such as 4K Ultra High-Definition (UHD) video, the Internet of Things (IoT), cloud computing, virtual reality (VR), augmented reality (AR), among others. As 5G radio access networks are implemented, the data throughput on fronthaul networks that connect RRHs with BBUs will grow exponentially. As a result, conventional transmission techniques, such as CPRI, for fronthaul radio access networks may not provide sufficient network capacity to enable scaling up to 5G demands in an economical or technically feasible manner. For example, 5G channel bands will create very high bandwidth demands that will dramatically increase equipment costs if conventional CPRI-based fronthaul network architectures are used.

In various 4G or 5G fronthaul designs, an RRH may digitize radio signals from an antenna and may communicate with the BBU through a fronthaul transport network, which typically has been implemented using CPRI. For example, when 4G LTE bands consume 20 MHz of bandwidth, a corresponding 2×2 antenna has two channels (i.e., two "layers" or "streams") and will consume 2.5 GB/s of CPRI fronthaul transport capacity, while a corresponding 8×8 antenna has eight channels and will consume 10 GB/s of CPRI fronthaul capacity. Note that these estimated CPRI fronthaul capacities correspond to the data rates per antenna sector. Today's wireless antenna towers typically include three sectors of 2×2 or 8×8 antennas consuming three times the CPRI fronthaul capacity presented above. However, 5G mm-wave bands are expected to consume 100 MHz of bandwidth (at 28 GHz carrier frequency) and 800 MHz of bandwidth (at 39 GHz carrier frequency). They are expected to be used with 64 channel or 128 channel antennas, e.g., with very high count multi-element antennas, which may also be referred to as multiple input multiple output (MIMO) antenna arrays, or massive MIMO antenna arrays. Multi-element antennas (such as M×N MIMO antennas) can provide dedicated, spatially-formed beams to serve users or group of users with very high capacity data through mm-wave based wireless signal carrier frequencies. In this 5G example, a 64 channel antenna (e.g., a 1024 or 4096 MIMO antenna with 64 streams that can provide 16 or 64 arrays per stream for beam forming) would consume 400 GB/s of CPRI fronthaul capacity at 100 MHz and 1.6 TB/s of CPRI fronthaul capacity at 800 MHz, while a 128 channel antenna would consume 800 GB/s of CPRI fronthaul capacity at 100 MHz and 3.2 TB/s of CPRI fronthaul capacity at 800 MHz. Note that these estimated CPRI fronthaul capacities correspond to the data rates per antenna sector. It is expected that a mm-wave based 5G antenna tower will have a much higher number of sectors than a 3-sector 4G antenna tower. Therefore, the CPRI fronthaul capacity of a 4-sector or 6-sector 5G wireless tower may be 4 or 6 times higher than the estimated numbers presented above. A CPRI digital optics transceiver can operate up to 10 Gb/s or 20 Gb/s data rates per wavelength using non-return-to-zero (NRZ) modulation or four-level pulse amplitude modulation (PAM4). In the example given above, a CPRI fronthaul network would require 80 or 160 WDM transceivers per sector located within the RRH and BBU to transport 800 MHz bandwidth digital wireless signals from a 64 stream 5G MIMO antenna. The CPRI fronthaul network of a 6-sector 5G wireless tower would be required to transport the capacity on 480 or 960 wavelengths over 6 fibers. This example illustrates that, due to the overhead and processing involved, the cost and equipment for scaling CPRI fronthaul capacity to 5G radio access network may be prohibitive. In many instances, the increased number of CPRI fronthaul channels that would be used with 5G radio access networks are simply not physically possible in existing 4G equipment, and are not economically feasible to implement with CPRI.

As will be described in further detail, efficient optical transport in radio access networks using radio-over-fiber (RoF) optical transport is disclosed herein. The efficient optical transport in radio access networks using RoF optical transport disclosed herein may enable lower cost by improving the transport bandwidth efficiency of fronthaul or backhaul networks as compared with using CPRI. The efficient optical transport in radio access networks using RoF optical transport disclosed herein may regenerate, aggregate and transport 5G mm-wave channel bands from MIMO antennas through the RRH to the BBU. A single coherent RoF transceiver located within the RRH and BBU can provide fronthaul capacity for the 800 MHz bandwidth digital wireless signals from a 64 stream 5G MIMO antenna on a single wavelength over a single fiber. The coherent RoF fronthaul network of a 6-sector 5G wireless tower would be required to transport the capacity on two wavelengths over a single fiber. The efficient optical transport in radio access networks using RoF optical transport disclosed herein may maintain the signal integrity of radio frequency (RF) wireless channels over fronthaul and backhaul networks using streams of optical digital subcarrier (ODS) signals.

Turning now to the drawings, FIG. 1, a block diagram of selected elements of an implementation of heterogeneous wireless network architecture 100 is depicted. As shown, heterogeneous wireless network architecture 100 depicts certain portions of an exemplary wireless network environment for efficient optical transport in radio access networks using RoF optical transport, as described herein. Although heterogeneous wireless network architecture 100 shown in FIG. 1 is a radio access network with large cells 102 and small cells 104, 105, as defined herein, it will be understood that various types of cells may be used, including equipment conforming to previous radio access network generations. For example, large cell 102 may represent an example of 3G or 4G radio access networks, while small cells 104, 105 may represent examples of 4G or 5G radio access networks. FIG. 1 is a schematic illustration and is not drawn to scale. It is noted that while FIG. 1 is presented in simplified form for descriptive clarity, heterogeneous wireless network architecture 100 may represent or describe very large and very complex radio access networks.

At the right side of heterogeneous wireless network architecture 100, backhaul network 114 is shown providing connectivity between central offices (CO) 116 that may form regional access points. Thus, in some implementations, backhaul network 114 may be referred to as a core network. More precisely, backhaul network 114 is defined as a fixed network linking BBUs 112 to each other. When the BBUs 112 are co-located within a single CO 116, backhaul network 114 may include local-area network (LAN) segments local to the single CO 116. When the BBUs 112 connected by backhaul network 114 are at different COs 116, backhaul network 114 may include wide-area network (WAN) segments.

At the left side of heterogeneous wireless network architecture 100, further details of a CO 116-1 and cellular site 101 are shown. At CO 116-1, various equipment and connections may be aggregated in different implementations, for example, to enable different sizes of service areas for CO 116-1. For example, there may be many large cell towers and small cell towers serving mobile wireless customers. Large towers and small (e.g., RRH only) towers may connect to the 116-1 CO thru many fronthaul links. The mechanisms described herein may address issues of high capacity due to segmenting the processing. A base station (BTS) 110 is shown as a large cell (macrocell) with a distributed base station architecture, including fronthaul network 108-1, remote radio head (RRH) 106, antenna 102, and BBUs 112-1. As shown, BBUs 112-1 are included with BTS 110, along with fronthaul network 108-1. In various implementations, CO 116-1 may include a plurality of BBUs 112-1 that may each control one or more base stations, such that BBUs 112-1 are aggregated within CO 116-1. In some implementations, further aggregation may be performed, such as by using BBU 112 or fronthaul network 108 to service additional instances of BTS 110. In some implementations, BTS 110 may represent a conventional macrocell in the form of a compact base station.

In FIG. 1, small cell 105 is shown as a small cell that integrates a radio unit (RU) and a digital unit (DU), such as a femtocell, and having direct access to backhaul network 114 for fixed network connectivity. Small cells 105 may support 4G or 5G radio access networks with corresponding antennas and equipment. In some implementations, small cell 105 may be interfaced with backhaul network 114 using a virtual BBU or vBBU (not shown) that serves as an endpoint within backhaul network 114. In some implementations, small cell 105 may include digital baseband processing, a BBU functionality, that is integrated within the RRH and the antenna.

In some embodiments of the present disclosure, the radio processing equipment (e.g., RRH 106) is separated from the digital processing equipment (e.g., BBUs 112), rather than both of these units being integrated into a base station (such as BTS 110). For example, the RRH may be moved nearer the antenna and may be connected to the BBU via a fiber optic cable (e.g., a 20 km fiber optic cable). Separating the RRH and BBU may enable the operator to move the BBU to a centralized location. This centralized office location may be referred to as a "BBU hotel." In some embodiments, the BBU functions may be performed using general purpose computing platforms that have been programmed to implement them, rather than by the special proprietary processors found in some existing systems. In some embodiments, a server farm comprising general-purpose platforms that have been so programmed may be linked to create a virtual computing cloud. In such embodiments, the BBU functionality may be moved to the virtual computing cloud as a "virtual BBU" (vBBU). The technical benefits of this approach include that fact that the 1:1 ratio between RRHs to BBUs may be expanded, giving the operator the ability to manage the same number of cell sites with less computing hardware. Radio access networks using centralized BBUs with virtual computing cloud may also be referred to as Cloud Radio Access Networks (C-RANs).

The benefits of implementing C-RANs may include the ability to pool resources, to reuse infrastructure, to simplify network operations and management, to support multiple technologies, to reduce energy consumption, to lower capital expenditures and/or to lower operating expenditures. In addition, the network itself may become more heterogeneous and self-organizing using this approach. Once implemented, a C-RAN may provide other benefits, such as easier and faster network deployments and increased network flexibility.

Introducing C-RAN may require very low latencies between the RRH and the BBU pool (the fronthaul network). These low latencies may typically require the use of fiber links. In some implementations, introducing C-RAN may also require sophisticated software to interconnect all of the BBUs in the server farm as well as to manage the complexity of BBU functions in the virtual computing cloud. In some implementations, the DU may include functionality that is similar to that of an RRH.

Additionally, aggregation is performed at CO 116-1 with BBU 112-2, which represents baseband units to support small cells 104 via fronthaul network 108-2. In various implementations, fronthaul network 108-2 may represent, or support, a cloud radio access network (C-RAN) architecture. Fronthaul network 108-2 may be a point-point network, a star network, a linear or bus network, or a ring network. Fronthaul network 108-2 may reach up to 10 km in some implementations. Small cells 104 include RRH and may represent picocells or femtocells, such as 4G or 5G compatible cells with corresponding antennas.

In operation, an optical network may be implemented in heterogeneous wireless network architecture 100 for efficient optical transport in radio access networks using RoF optical transport, as disclosed herein. Specifically, the optical network may be used to implement fronthaul network 108 or backhaul network 114, or various portions thereof, in different implementations, using RoF optical transport. In RoF optical transport, the RF signal received and transmitted at the antenna 102 is directly carried by an optical fiber. A coherent RoF transceiver (see also FIGS. 3, 4, and 5) may be used to interface between the RF signal and the RoF optical transport at the RRH and at the BBU. At the BBU, instead of interfacing to a wireless RF signal, the RoF optical transport may be converted to a galvanic RF signal that is carried and further processed using backhaul network 114.

Figure 2:
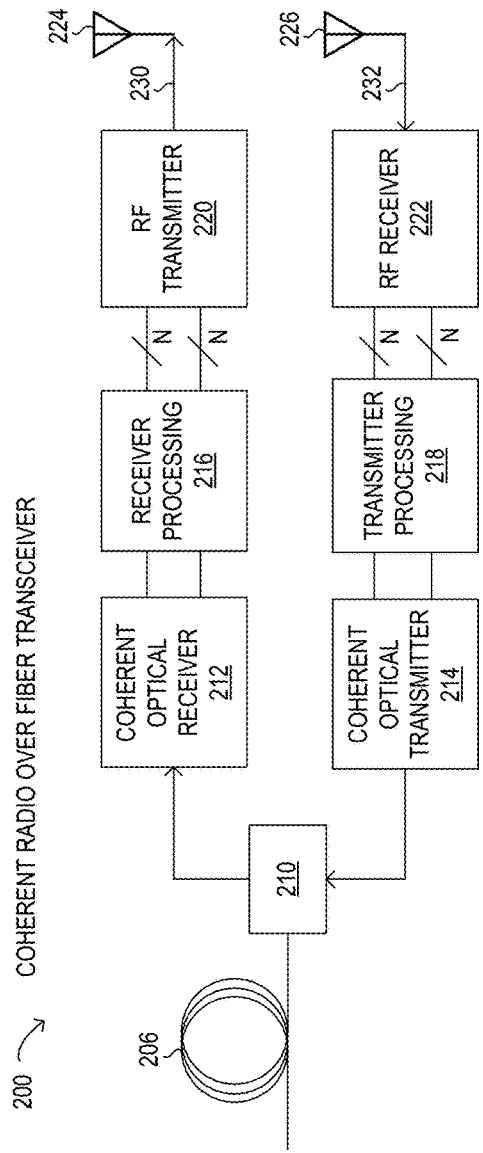
FIG. 2 is a block diagram of selected elements of an implementation of a coherent radio-over-fiber transceiver.
Figure 3:
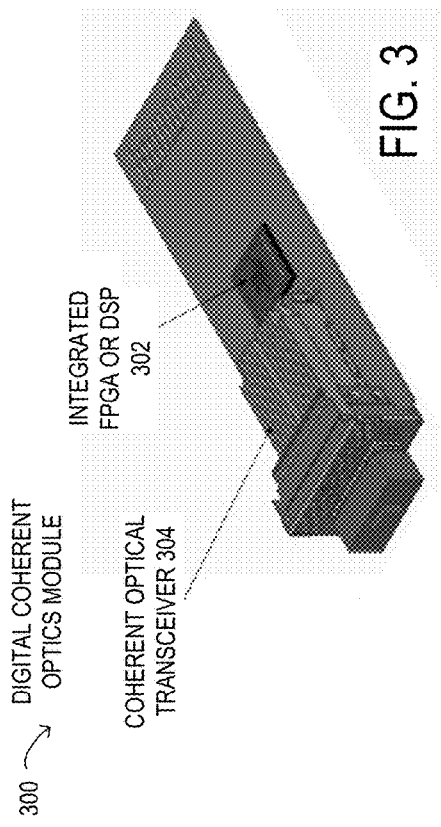
FIG. 3 is a depiction of an implementation of a coherent radio-over-fiber transceiver.

Turning now to FIGS. 2 and 3, a block diagram of selected elements of an implementation of a coherent RoF transceiver 200 is shown in FIG. 2, and a depiction of a sled board implementation of coherent RoF transceiver 200 is shown in FIG. 3 as plug-in digital coherent optics module 300. In this example, digital coherent optics module 300 includes, among other elements, an integrated field programmable gate array (FPGA) or digital signal processor (DSP) including an ADC/DAC (shown as component 302) and a coherent optical transceiver 304. In this example, components 302 and 304, collectively, implement a coherent RoF transceiver, such as coherent RoF transceiver 200. In other implementations, digital coherent optics module 300 may include multiple integrated FPGA or DSP components 302 with ADC/DACs, or multiple discrete ADC components and/or discrete DAC components. In other embodiments, coherent RoF transceiver 200 may be implemented as a board mounted digital optics module or using multiple discrete components integrated on an internal system board (e.g., a mother board of a computing system or a routing switch). FIG. 2 is a schematic diagram and is not drawn to scale or perspective. FIG. 3 depicts a plug-in module that may be about 80 mm in width and about 230 mm in length in a particular implementation. It will be understood that various form-factors and device designs may be used to implement coherent RoF transceiver 200 or digital coherent optics module 300.

In FIG. 2, coherent RoF transceiver 200 is shown in a configuration for use in a RRH, with interfaces to a transmitting antenna 224 and a receiving antenna 226, as described in further detail below. It will be understood that transmitting antenna 224 and receiving antenna 226 may represent any of a variety of antennas, and may represent functionality of a single antenna at different times or over different channels. For example, transmitting antenna 224 and receiving antenna 226 may represent any of the antennas 102, 104, or 105 shown in FIG. 1, in particular embodiments. Transmitting antenna 224 and receiving antenna 226 may represent RF functionality implemented by a massive MIMO antenna that can enable parallel connections (also referred to as 'layers') with a corresponding plurality of wireless end devices (not shown). For example, transmitting antenna 224 and receiving antenna 226 may represent a multi-element hybrid beam forming antenna that can support 64 or 128 layers. Accordingly, transmitting antenna 224 and receiving antenna 226 may support 4G and 5G radio access networks, and may include 5G mm-wave antennas.

As shown in FIG. 2, receiving antenna 226 provides a first RF signal 232 to an RF receiver 222, while an RF transmitter 220 supplies a second RF signal 230 to transmitting antenna 224 in the RRH configuration of coherent RoF transceiver 200. It will be understood that instead of terminating and supporting transmitting antenna 224 and receiving antenna 226, coherent RoF transceiver 200 may support circuitry to further process and decode the RF signals 230, 232 for communication with backhaul network 114 (see FIG. 1), in which case RF transmitter 220 and RF receiver 222 do not communicate with an antenna, but with corresponding network equipment of backhaul network 114, for example. RF transmitter 220 may include power amplification and other functionality to process and prepare second RF signal 230, while RF receiver 222 may include similar functionality to receive and process first RF signal 232. Receiver processing element 216 (see also FIG. 4) may include various functions or circuitry for receiving ODS signals (e.g., quadrature signals I and Q) from a coherent optical receiver 212 and for generating an output signal including multiple subcarrier streams to RF transmitter 220, including second RF signal 230 or a similar signal. Transmitter processing element 218 (see also FIG. 5) may include various functions or circuitry for transmitting ODS signals (e.g., quadrature signals I and Q) to a coherent optical transmitter 214 from an output signal (including multiple subcarrier streams) from RF receiver 222, including first RF signal 232 or a similar signal.

As shown, an optical element 210 may be used to distinguish incoming optical signals routed to coherent optical receiver 212 from outgoing optical signals from coherent optical transmitter 214. Accordingly, in particular embodiments, optical element 210 may be a circulator or a wavelength-division multiplexing (WDM) filter that is coupled to optical fiber 206. In other embodiments, optical element 210 may be, or include, another type of optical splitter or combiner, such as a passive optical splitter/combiner. Optical fiber may represent a portion of fronthaul network 108-1 or a portion of fronthaul network 108-2 shown in FIG. 1, in particular embodiments.

Figure 4:
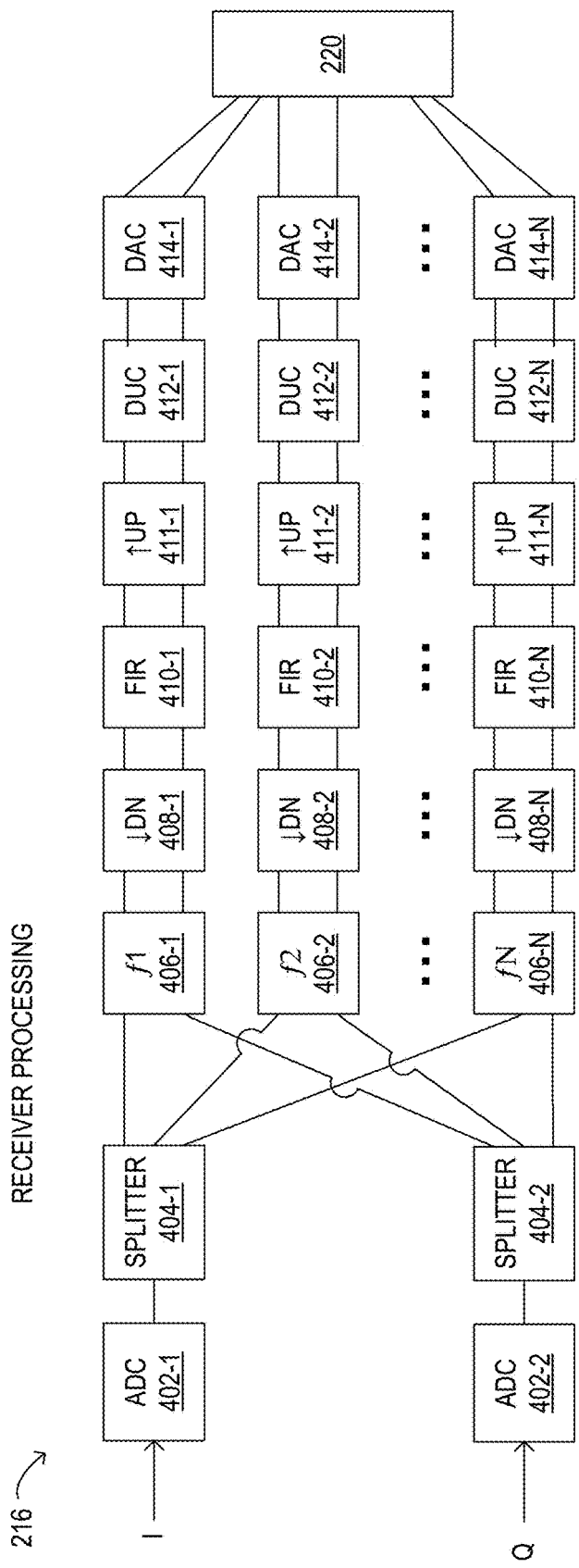
FIG. 4 is a block diagram of selected elements of an implementation of a receiver processing element.

Turning now to FIG. 4, a block diagram of selected elements of an implementation of receiver processing element 216 is shown. Receiver processing element 216 may receive quadrature signals I and Q representing output signals from coherent optical receiver 212 (see FIG. 2) that may be processed in parallel. For example, quadrature signal I may be digitized by ADC 402-1 and then replicated by splitter 404-1, which sends one output to f1 406-1, one output to f2 406-2 and other outputs to other instances of element 406 (i.e., f3 406-3, . . . , fN 406-N). Similarly, quadrature signal Q may be digitized by ADC 402-2 and then replicated by splitter 404-2, which sends one output to f1 406-1, one output to f2 406-2 and other outputs to other instances of element 406 (i.e., f3 406-3, . . . , fN 406-N). In this example, f1 406-1 performs digital subcarrier frequency down conversion (DDC) at frequency f1 from both I and Q streams and sends the output digital subcarrier signals to element 408-1, which down samples the output of f1 406-1. In other embodiments, each element 406 may perform both down conversion and down sampling. The down-sampled signals are then passed to a finite impulse response (FIR) filter 410-1 that digitally processes signals to recover, track, and compensate the optical carrier phase, polarization, data clock, I/Q skew in the time domain, I/Q amplitude imbalance, and dispersion of each subcarrier signal stream. Similarly, f2 406-2 performs digital subcarrier frequency down conversion (DDC) at frequency f2 from both I and Q streams and sends the output digital subcarrier signals to element 408-2, which down samples the output of f2 406-2. The down-sampled signals are then passed to a finite impulse response (FIR) filter 410-2 that digitally processes signals to recover, track, and compensate the optical carrier phase, polarization, data clock, I/Q skew in the time domain, I/Q amplitude imbalance, and dispersion of each subcarrier signal stream. In this example, the output from FIR filter 410-1 is passed to element 411-1, which performs up sampling, and the output from element 411-1 is passed to element 412-1, which performs digital frequency up conversion (DUC) to stream 1. Subsequently, DAC 414-1 outputs frequency up converted subcarrier streams to RF transmitter 220. Similarly, the output from FIR filter 410-2 is passed to element 411-2, which performs up sampling, and the output from element 411-2 is passed to element 412-2, which performs digital frequency up conversion (DUC) to stream 2, after which DAC 414-2 outputs frequency up converted subcarrier streams to RF transmitter 220. Similar elements 406-414 corresponding to steams 3 to N process signals at frequencies f3 to fN, respectively, from both I and Q streams, the outputs of which are passed to RF transmitter 220 by respective DAC elements 414.

Figure 5:
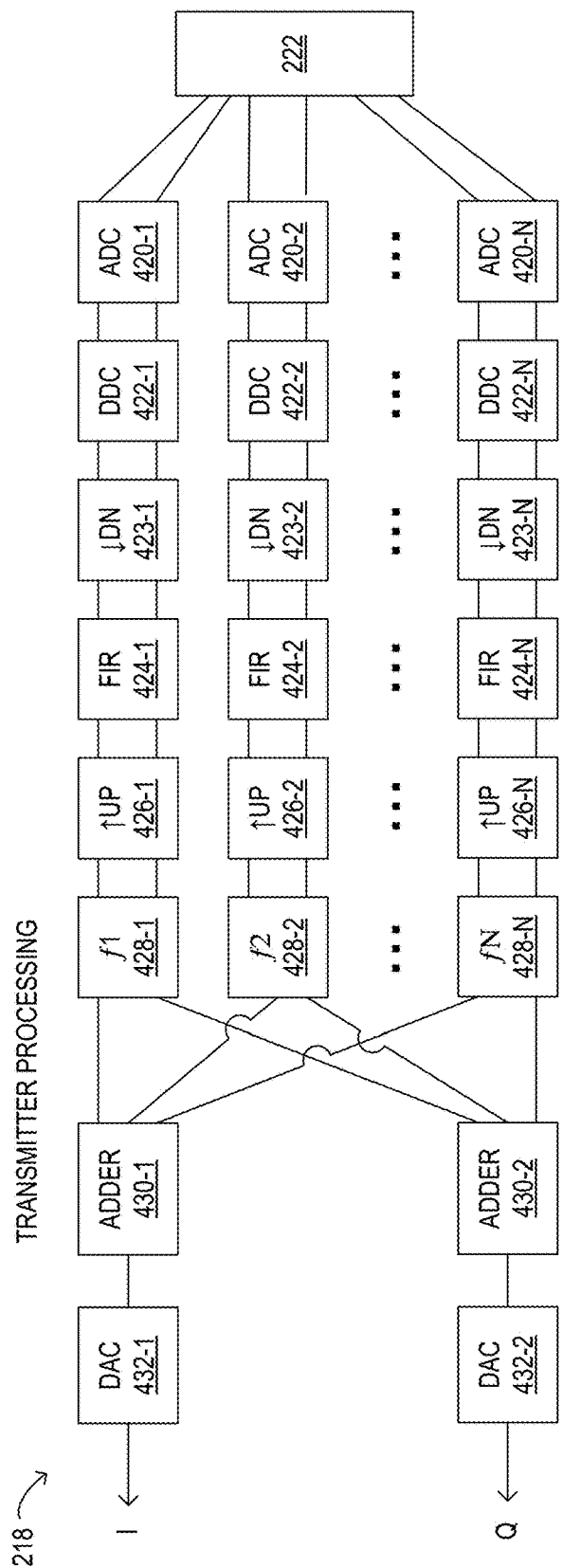
FIG. 5 is a block diagram of selected elements of an implementation of a transmitter processing element.

Turning now to FIG. 5, a block diagram of selected elements of an implementation of transmitter processing element 218 is shown. Transmitter processing element 218 may receive an RF signal from RF receiver 222, including first RF signal 232 or a similar signal (see FIG. 2) that may be processed to transmit an optical signal as quadrature signals I and Q. For example, different subcarrier streams may be digitized by respective ADC elements 420, after which they may be down converted by respective elements 422 and down sampled by respective elements 423. The down converted and down sampled signals may be sent to respective finite impulse response (FIR) filters 424 that digitally process signals to recover, track, and compensate the wireless carrier phase, polarization, data clock, I/Q skew in the time domain, I/Q amplitude imbalance, and dispersion of each subcarrier signal stream. The filtered signals may then be up sampled by respective elements 426. In this example, respective instances of element 428 may perform digital subcarrier frequency up conversion (DUC) at different frequencies (i.e., f1, . . . , fN) and provide the resulting signals to multiple adder elements 430. For example, f1 428-1 may provide one output to adder 430-1 and another output to adder 430-2. Similarly, f2 428-2 may provide one output to adder 430-1 and another output to adder 430-2, and so on. In other embodiments, each element 428 may perform both up sampling and up conversion. Adder 430-1 may combine the outputs of multiple elements 428 and provide them to DAC 432-1 to generate quadrature signal I for transmission. Similarly, adder 430-2 may combine the outputs of multiple elements 428 and provide them to DAC 432-2 to generate quadrature signal Q for transmission.

In some embodiments, coherent RoF transceiver 200 may be enabled to directly transmit radio access signals over optical fiber by taking the wireless signals modulated on the wireless carriers vertical (V) and horizontal (H) polarization and phase modulating directly to the V and H polarization of the optical carrier. In such embodiments, the elements of receiver processing element 216 shown in FIG. 4 and the elements of transmitter processing element 218 shown in FIG. 5 may be duplicated, with one collection of N instances of each element 406-414 and 420-428 processing signals for the V polarizations and the other collection of N instances of each element 406-414 and 420-428 processing signals for the H polarizations.

In some embodiments, some or all of elements 402 to 414 and 420 to 432 illustrated in FIGS. 4 and 5 may be implemented within one or more FPGAs. In some embodiments, some or all of elements 402 to 414 and 420 to 432 illustrated in FIGS. 4 and 5 may be implemented by one or more DSPs. In various embodiments, logic and/or circuitry for implementing any or all of receiver processing elements 402 to 414 may be integrated together on a single FPGA or DSP device (e.g., for improved signal integrity), or may be distributed between two or more such devices (or other suitable types of devices), in any combination. Similarly, logic and/or circuitry for implementing any or all of transmitter processing elements 420 to 432 may be integrated together on a single FPGA or DSP device, or may be distributed between two or more such devices (or other suitable types of devices), in any combination.

Figure 6A:
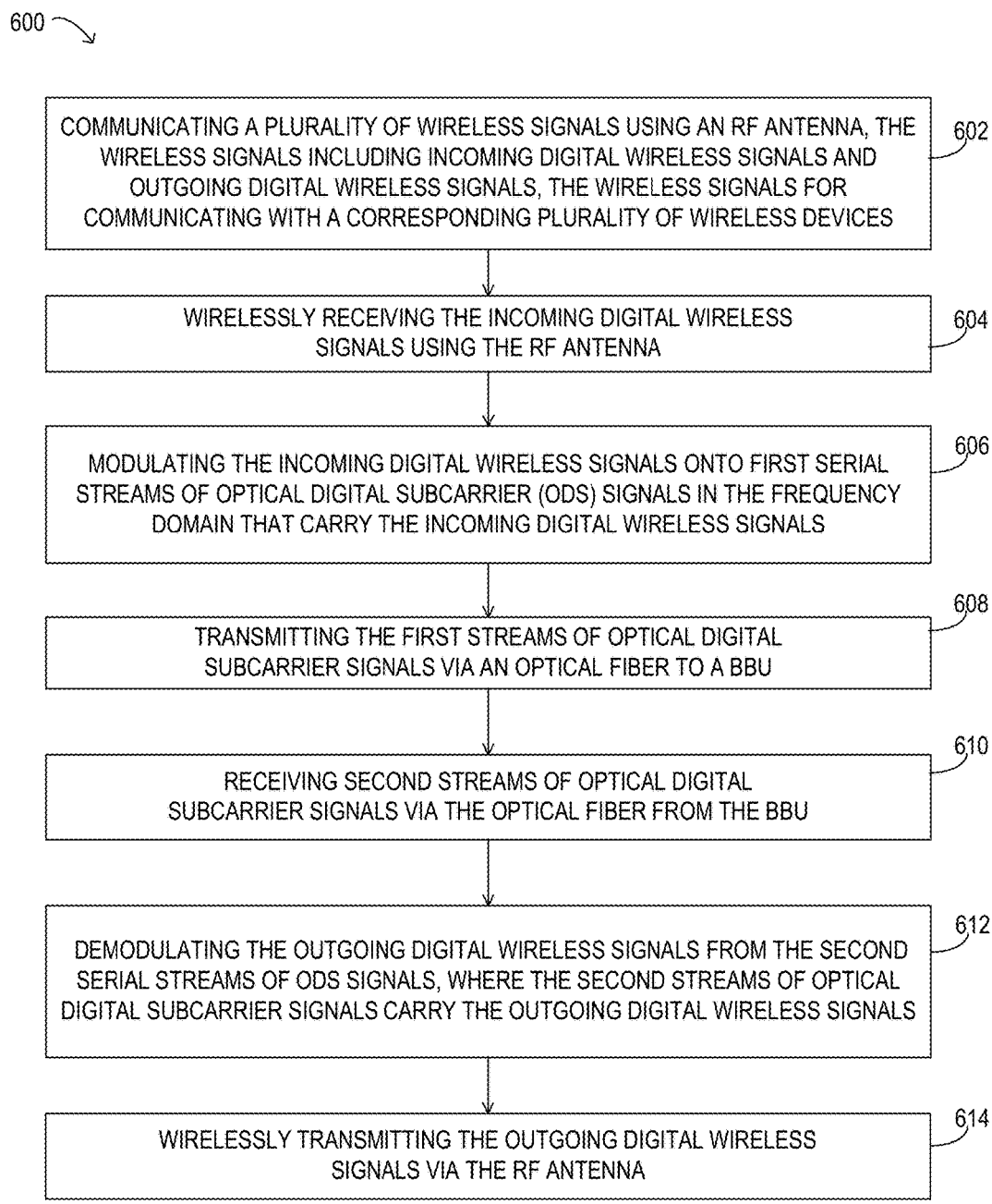
FIGS. 6A and 6B are flow charts depicting selected elements of an implementation of a method for radio-over-fiber transmission of wireless signals.

Turning now to FIG. 6A, a block diagram of selected elements of an implementation of a method 600 for RoF transmission of wireless signals is shown in flow chart format. Method 600 may be performed using heterogeneous wireless network architecture 100 in conjunction with multiple coherent RoF transceivers, such as coherent RoF transceiver 300, as described above. It is noted that certain operations depicted in method 600 may be rearranged or omitted, as desired. In particular embodiments, some or all of the elements depicted in FIG. 6A may be implemented by a remote radio head (RRH) coupled to an RF antenna. In particular embodiments, some or all of the elements depicted in FIG. 6B may be implemented by a baseband unit (BBU).

Method 600 may begin at step 602 by communicating a plurality of wireless signals using an RF antenna, the wireless signals including incoming digital wireless signals and outgoing digital wireless signals, the wireless signals for communicating with a corresponding plurality of wireless devices. In particular embodiments, the incoming digital wireless signals and outgoing digital wireless signals may be quadrature amplitude modulated (QAM) signals (e.g., 16-QAM signals, 64-QAM signals, 256-QAM signals, or any M-QAM signals, including lower- or higher-order QAM signals). For example, signals received by the RF antenna may be down converted from the carrier frequency at which they were received to an intermediate frequency, and the payload information may be carried as baseband QAM signals on the intermediate frequency. These down converted signals are sometimes referred to as RF signals or RF QAM signals. In other embodiments, the digital wireless signals and outgoing digital wireless signals may use a different modulation format, such as quadrature phase-shift keying (QPSK), orthogonal frequency-division multiplexing (OFDM), or filter bank multi-carrier (FBMC) modulation, among others. In general, the incoming digital wireless signals are the baseband representations of the RF wireless signals after digital down conversion.

At step 604, the incoming digital wireless signals are wirelessly received using the RF antenna. At step 606, the incoming digital wireless signals are processed to produce first streams of optical digital subcarrier (ODS) signals, where the first streams of ODS signals carry the incoming digital wireless signals. For example, the processing may include modulating the incoming digital wireless signals onto first serial streams of ODS signals in the frequency domain, and the modulating may include phase modulation of at least one polarization component in the optical domain. In certain embodiments, processing the incoming digital wireless signals may include re-sampling, re-constructing, and frequency multiplexing the incoming digital wireless signals. At step 608, the first streams of ODS signals are transmitted via an optical fiber to a BBU. At step 610, second streams of ODS signals are received via the optical fiber from the BBU. At step 612, the outgoing digital wireless signals are constructed by processing the second streams of ODS signals, where the second streams of ODS signals carry the outgoing digital wireless signals. For example, the processing may include demodulating the outgoing digital wireless signals from the second serial streams of ODS signals, where the demodulating includes phase demodulation of at least one polarization component in the optical domain. In certain embodiments, processing the second streams of ODS signals may include frequency de-multiplexing, re-constructing, and re-sampling the second streams of ODS signals. At step 614, the outgoing digital wireless signals are wirelessly transmitted via the RF antenna.

Figure 6B:
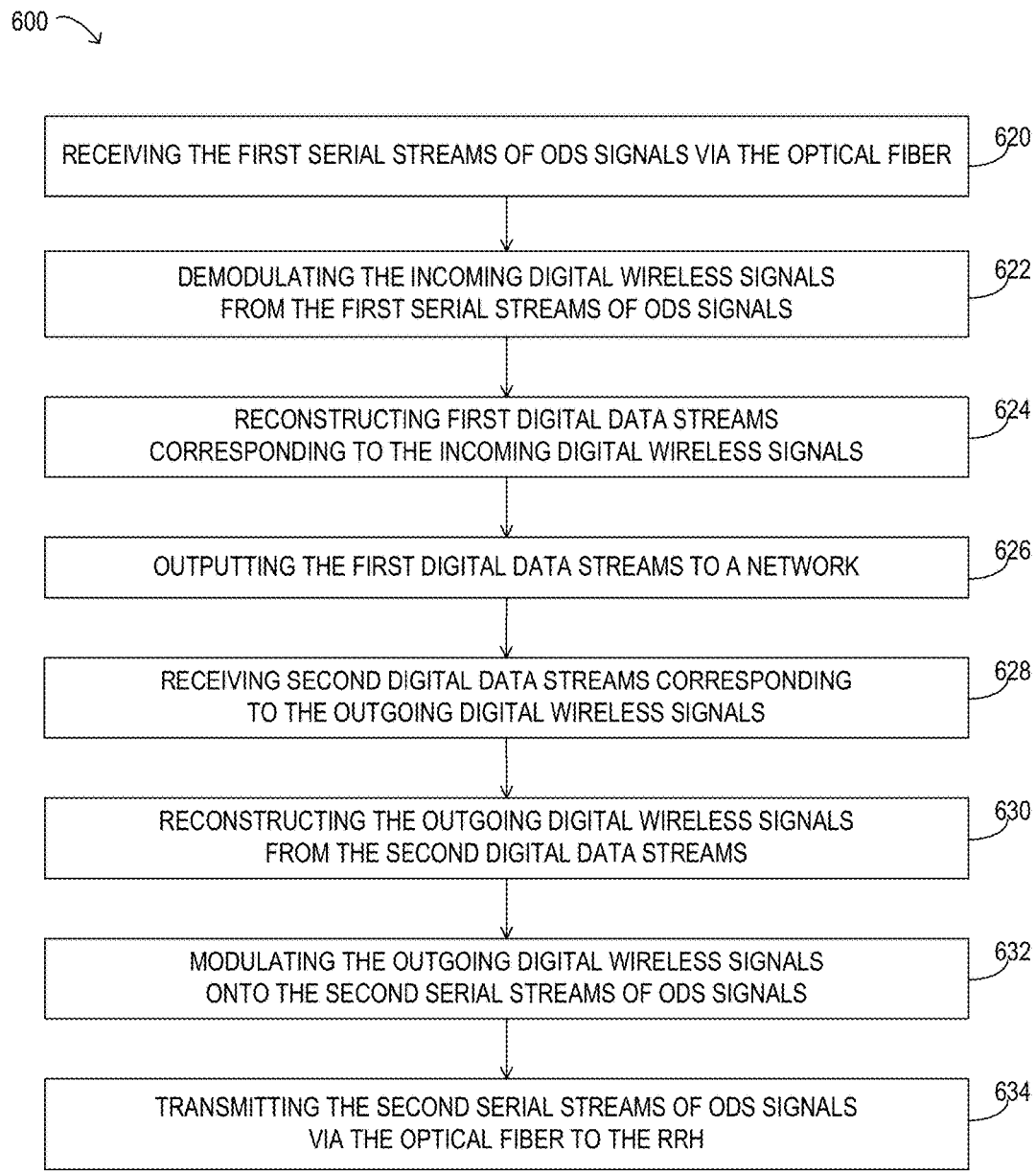

Turning now to FIG. 6B, method 600 may also include, at step 620, receiving the first serial streams of ODS signals via the optical fiber. For example, the first serial streams of ODS signals may be received from the RRH. The first serial streams of ODS signals are then processed by demodulating the incoming digital wireless signals from the first serial streams of ODS signals, at step 622, and reconstructing first digital data streams corresponding to the incoming digital wireless signals, at step 624. At step 626, the first digital data streams are output to a network. At 628, second digital data streams corresponding to the outgoing digital wireless signals are received. For example, the second digital data streams may be received from a network. At step 630, the outgoing digital wireless signals are reconstructed from the second digital data streams. At step 632, the outgoing digital wireless signals are modulated onto the second serial streams of ODS signals. At step 634, the second serial streams of ODS signals are transmitted to the RRH via the optical fiber.

As disclosed herein, a method and system for efficient optical transport in radio access networks using radio-over-fiber optical transport may directly transmit radio access signals over an optical fiber using optical transport networking. A coherent RoF transceiver may directly transmit the radio access signals over optical fiber by taking the wireless signals modulated on the wireless carriers V and H polarization and phase modulating directly to the V and H polarization of the optical carrier. The coherent RoF transceiver may frequency multiplex/up convert to respective designated frequencies f1, f2, . . . fN the wireless signal received in parallel streams from an RF antenna into serial streams by phase modulating the optical carrier. Unlike in existing optical networks, the coherent RoF transceiver may not intensity modulate the optical carrier. This may allow the transceiver to pack the wireless signals (as optical subcarrier signals) with a frequency spacing of 100 MHz or 800 MHz, for example, on each side of the optical carrier (forming a Hermitian symmetry), for more efficient use of the available bandwidth than is possible in systems that employ CPRI.

A radio-over-fiber transceiver to enable efficient optical transport in radio access networks may be implemented as a plug-in digital optics module or as a board mounted digital optics module, in different embodiments.

The above disclosed subject matter is to be considered illustrative, and not restrictive, and the appended claims are intended to cover all such modifications, enhancements, and other implementations which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for radio-over-fiber transmission of wireless signals, the system comprising:
   a radio-frequency (RF) interleaved hybrid beam-forming antenna enabled to communicate using a plurality of digital wireless signals, including incoming digital wireless signals and outgoing digital wireless signals, with a corresponding plurality of wireless devices;
   a baseband unit (BBU); and
   a remote radio head (RRH) coupled to the RF interleaved hybrid beam-forming antenna and enabled for:
      wirelessly receiving the incoming digital wireless signals using the RF interleaved hybrid beam-forming antenna;
      modulating the incoming digital wireless signals onto first serial streams of optical digital subcarrier (ODS) signals in the frequency domain, wherein the modulating includes phase modulation of at least one polarization component in the optical domain, and wherein the first serial streams of ODS signals carry the incoming digital wireless signals;
      transmitting the first serial streams of ODS signals via an optical fiber to the BBU;
      receiving second serial streams of ODS signals via the optical fiber from the BBU;
      demodulating the outgoing digital wireless signals from the second serial streams of ODS signals, wherein the demodulating includes phase demodulation of at least one polarization component in the optical domain, and wherein the second serial streams of ODS signals carry the outgoing digital wireless signals; and
      wirelessly transmitting the outgoing digital wireless signals via the RF interleaved hybrid beam-forming antenna.

2. The system of claim 1, wherein the BBU is enabled for:
   receiving the first serial streams of ODS signals via the optical fiber from the RRH;
   demodulating the incoming digital wireless signals from the first serial streams of ODS signals;
   reconstructing a first plurality of digital data streams corresponding to the incoming digital wireless signals; and
   outputting the first plurality of digital data streams to a network.

3. The system of claim 1, wherein the BBU is enabled for:
   receiving a second plurality of digital data streams corresponding to the outgoing digital wireless signals;
   reconstructing the outgoing digital wireless signals from the second plurality of digital data streams;
   modulating the outgoing digital wireless signals onto the second serial streams of ODS signals; and
   transmitting the second serial streams of ODS signals via the optical fiber to the RRH.

4. The system of claim 1, wherein modulating the incoming digital wireless signals onto the first serial streams of ODS signals further comprises:
   modulating each incoming digital wireless signal from the RRH onto a respective optical channel in the first serial streams of ODS signals.

5. The system of claim 1, wherein modulating the incoming digital wireless signals onto the first serial streams of ODS signals further comprises:
   modulating at least two incoming digital wireless signals from the RF interleaved hybrid beam-forming antenna onto an optical channel in the first serial streams of ODS signals.

6. A radio-over-fiber transceiver for use at a remote radio head (RRH) for radio-over-fiber transmission, the radio-over-fiber transceiver further comprising:
   first circuitry to receive a plurality of analog signals, the analog signals directly corresponding to a plurality of digital wireless signals communicated by a radio-frequency (RF) interleaved hybrid beam-forming antenna and including incoming digital wireless signals and outgoing digital wireless signals, the RF interleaved hybrid beam-forming antenna enabled to communicate the digital wireless signals with a corresponding plurality of wireless devices;
   second circuitry for modulating the incoming digital wireless signals onto first serial streams of optical digital subcarrier (ODS) signals in the frequency domain, wherein the modulating includes phase modulation of at least one polarization component in the optical domain, and wherein the first serial streams of ODS signals carry the incoming digital wireless signals;
   third circuitry for transmitting the first serial stream of ODS signals via an optical fiber to a baseband unit (BBU);
   fourth circuitry for receiving second serial streams of ODS signals via the optical fiber from the BBU;
   fifth circuitry for demodulating the outgoing digital wireless signals from the second serial streams of ODS signals, wherein the demodulating includes phase demodulation of at least one polarization component in the optical domain, and wherein the second serial streams of ODS signals carry the outgoing digital wireless signals; and
   sixth circuitry for wirelessly transmitting the outgoing digital wireless signals via the RF interleaved hybrid beam-forming antenna.

7. The radio-over-fiber transceiver of claim 6, wherein the second circuitry is further for:
   modulating each incoming digital wireless signal from the RF interleaved hybrid beam-forming antenna onto a respective optical channel in the first serial streams of ODS signals.

8. The radio-over-fiber transceiver of claim 6, wherein the second circuitry is further for:
   modulating at least two incoming digital wireless signals from the RF interleaved hybrid beam-forming antenna onto an optical channel in the first serial streams of ODS signals.

9. The radio-over-fiber transceiver of claim 6, wherein:
   the first circuitry and the sixth circuitry are enabled to communicate with the RF interleaved hybrid beam-forming antenna.

10. The radio-over-fiber transceiver of claim 6, implemented as a plug-in digital coherent optics module.

11. The radio-over-fiber transceiver of claim 6, implemented as a board mounted digital coherent optics module.

12. A method for radio-over-fiber transmission of wireless signals, the method comprising:
   communicating a plurality of digital wireless signals using a radio-frequency (RF) interleaved hybrid beam-forming antenna, the digital wireless signals including incoming digital wireless signals and outgoing digital wireless signals, the digital wireless signals for communicating with a corresponding plurality of wireless devices;

wirelessly receiving the incoming digital wireless signals using the RF interleaved hybrid beam-forming antenna;

modulating the incoming digital wireless signals onto first serial streams of optical digital subcarrier (ODS) signals in the frequency domain, wherein the modulating includes phase modulation of at least one polarization component in the optical domain, and wherein the first serial streams of ODS signals carry the incoming digital wireless signals;

transmitting the first serial streams of ODS signals via an optical fiber to a baseband unit (BBU);

receiving second serial streams of ODS signals via the optical fiber from the BBU;

demodulating the outgoing digital wireless signals from the second serial streams of ODS signals, wherein the demodulating includes phase demodulation of at least one polarization component in the optical domain, and wherein the second serial streams of ODS signals carry the outgoing digital wireless signals; and wirelessly transmitting the outgoing digital wireless signals via the RF interleaved hybrid beam-forming antenna.

13. The method of claim 12, further comprising performing, by the BBU:

receiving the first serial streams of ODS signals via the optical fiber;

demodulating the incoming digital wireless signals from the first serial streams of OTN signals;

reconstructing a first plurality of digital data streams corresponding to the incoming digital wireless signals; and outputting the first plurality of digital data streams to a network.

14. The method of claim 12, further comprising performing, by the BBU:

receiving a second plurality of digital data streams corresponding to the outgoing digital wireless signals;

reconstructing the outgoing wireless signals from the second plurality of digital data streams;

modulating the outgoing digital wireless signals onto the second serial streams of ODS signals; and transmitting the second serial streams of ODS signals via the optical fiber.

15. The method of claim 11, wherein modulating the incoming digital wireless signals onto the first serial streams of ODS signals further comprises:

modulating each incoming digital wireless signal from the RRH onto a respective optical channel in the first serial streams of ODS signals.

16. The method of claim 11, wherein modulating the incoming digital wireless signals onto the first serial streams of ODS signals further comprises:

modulating at least two incoming digital wireless signals from the RF interleaved hybrid beam-forming antenna onto an optical channel in the first serial streams of ODS signals.

\* \* \* \* \*